United States Patent
Sasaki et al.

(10) Patent No.: US 9,664,972 B2
(45) Date of Patent: May 30, 2017

(54) LIQUID CRYSTAL DISPLAY APPARATUS

(71) Applicant: NLT TECHNOLOGIES, LTD., Kawasaki, Kanagawa (JP)

(72) Inventors: Takeshi Sasaki, Kanagawa (JP); Satoshi Inada, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 0 days.

(21) Appl. No.: 14/807,490

(22) Filed: Jul. 23, 2015

(65) Prior Publication Data
US 2016/0026051 A1    Jan. 28, 2016

(30) Foreign Application Priority Data
Jul. 24, 2014   (JP) ................................. 2014-150345

(51) Int. Cl.
G02F 1/1343 (2006.01)
G02F 1/1362 (2006.01)
G02F 1/1333 (2006.01)
G02F 1/1368 (2006.01)

(52) U.S. Cl.
CPC ...... *G02F 1/136286* (2013.01); *G02F 1/1368* (2013.01); *G02F 1/133345* (2013.01); *G02F 1/134363* (2013.01); *G02F 1/136227* (2013.01); *G02F 2001/136218* (2013.01)

(58) Field of Classification Search
CPC ..... G02F 1/136286; G02F 2001/13629; G02F 1/134363; G02F 2001/134372
See application file for complete search history.

(56) References Cited

U.S. PATENT DOCUMENTS 5,771,082 A * 6/1998 Chaudet ............ G02F 1/136213
　　　　　　　　　　　　　　　　　349/111
6,028,653 A * 2/2000 Nishida ............. G02F 1/134363
　　　　　　　　　　　　　　　　　349/139

(Continued)

FOREIGN PATENT DOCUMENTS

JP        4858820 B2     1/2012

*Primary Examiner* — Phu Vu
(74) *Attorney, Agent, or Firm* — Sughrue Mion, PLLC

(57) ABSTRACT

A lateral electric field type liquid crystal display apparatus includes a first substrate on which pixels are disposed in a matrix shape, each of the pixels including a plurality of signal wirings and a plurality of scanning wirings which intersect each other, a switching element provided in a region adjacent to a portion in which the signal wiring and the scanning wiring intersect or on the scanning wiring, a pixel electrode connected to the switching element, and a counter electrode to which a common potential is supplied from a common potential wiring; a second substrate provided to face the first substrate; and a liquid crystal provided between the first and second substrates, wherein a first electric field shield electrode, which is set to the common potential, is provided between the signal wiring and the first substrate, and the first electric field shield electrode is electrically connected with a first wiring which supplies the common potential to the first electric field shield electrode, within a display region, and an electric field substantially parallel to the first substrate is applied between the pixel electrode and the counter electrode.

7 Claims, 22 Drawing Sheets

(56) References Cited

U.S. PATENT DOCUMENTS

| | | | | |
|---|---|---|---|---|
| 6,380,561 | B1* | 4/2002 | Ohtani | G02F 1/136213 |
| | | | | 257/71 |
| 7,423,701 | B2* | 9/2008 | Nakayoshi | G02F 1/136213 |
| | | | | 349/111 |
| 7,548,295 | B2* | 6/2009 | Kawasaki | G02F 1/134363 |
| | | | | 349/141 |
| 8,253,909 | B2* | 8/2012 | Ishii | G02F 1/136227 |
| | | | | 349/110 |
| 8,310,641 | B2* | 11/2012 | Nakayoshi | G02F 1/136213 |
| | | | | 349/141 |
| 2007/0216842 | A1* | 9/2007 | Kawasaki | G02F 1/1368 |
| | | | | 349/141 |
| 2012/0127388 | A1* | 5/2012 | Nakayoshi | G02F 1/136213 |
| | | | | 349/43 |

* cited by examiner

CAPACITIVE COUPLING REGION BETWEEN SIGNAL
WIRING AND LOWER SHIELD COM ELECTRODE

CAPACITIVE COUPLING REGION BETWEEN SIGNAL
WIRING AND LOWER SHIELD COM ELECTRODE

F I G. 7 A
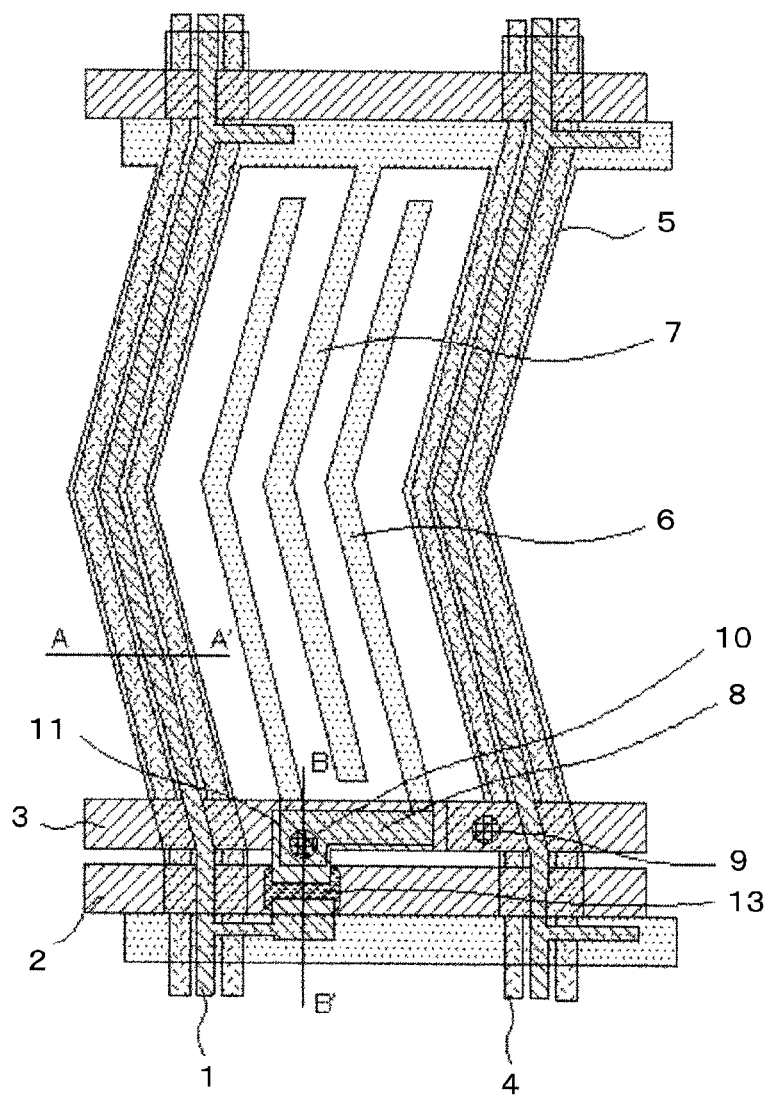

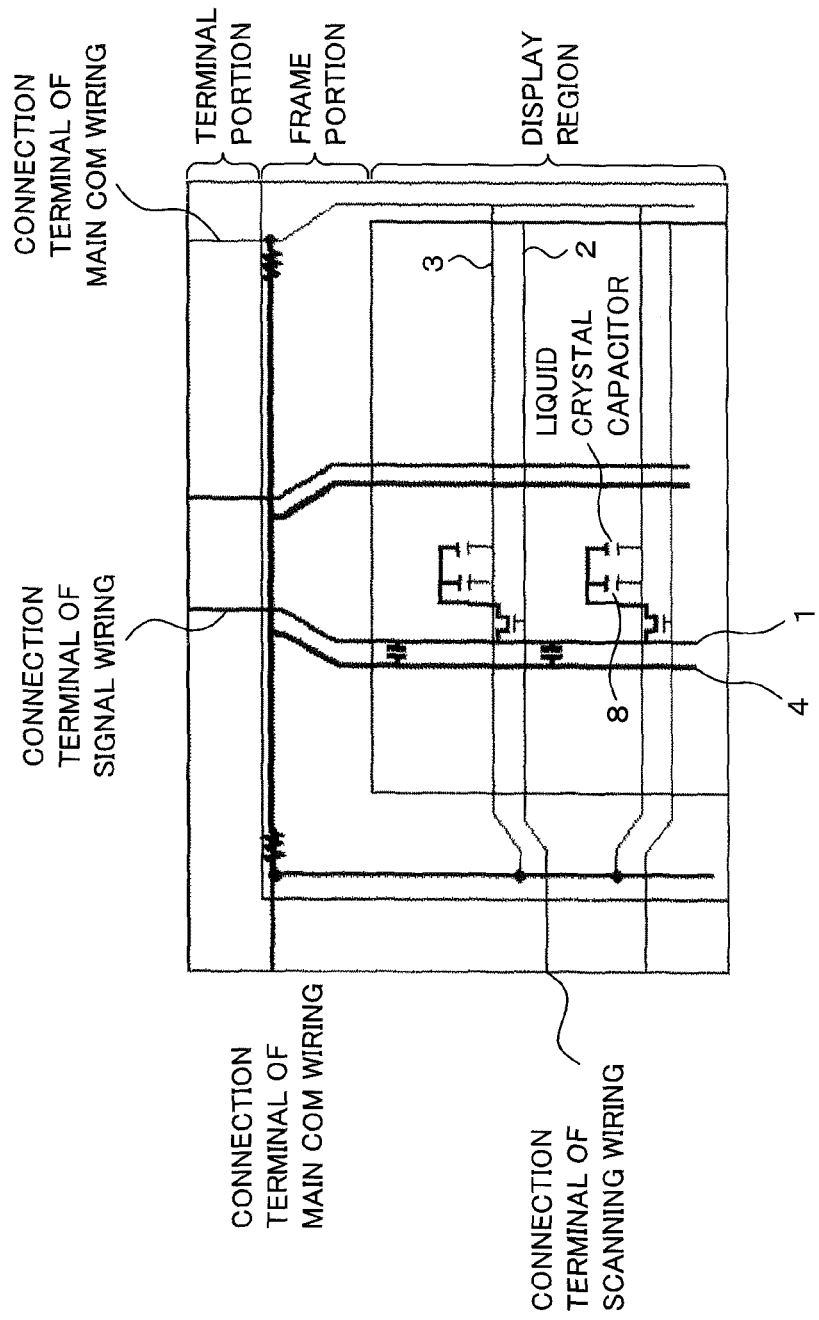

F I G. 1 0 A
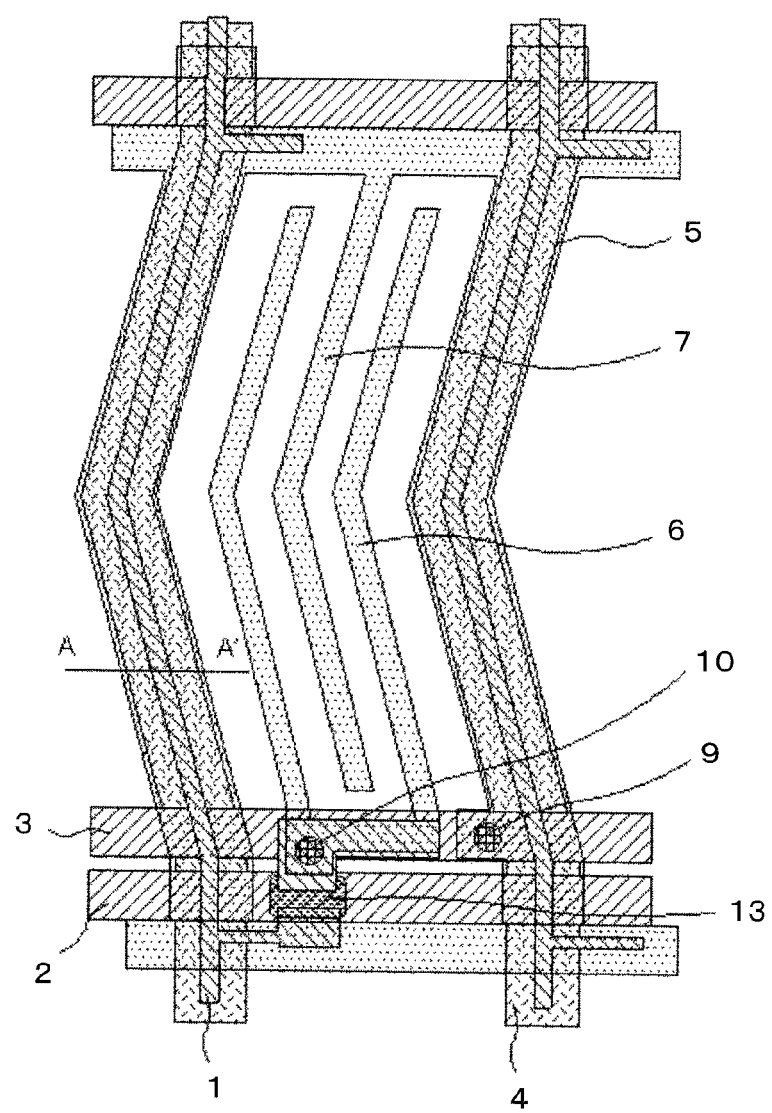

F I G. 1 1 C
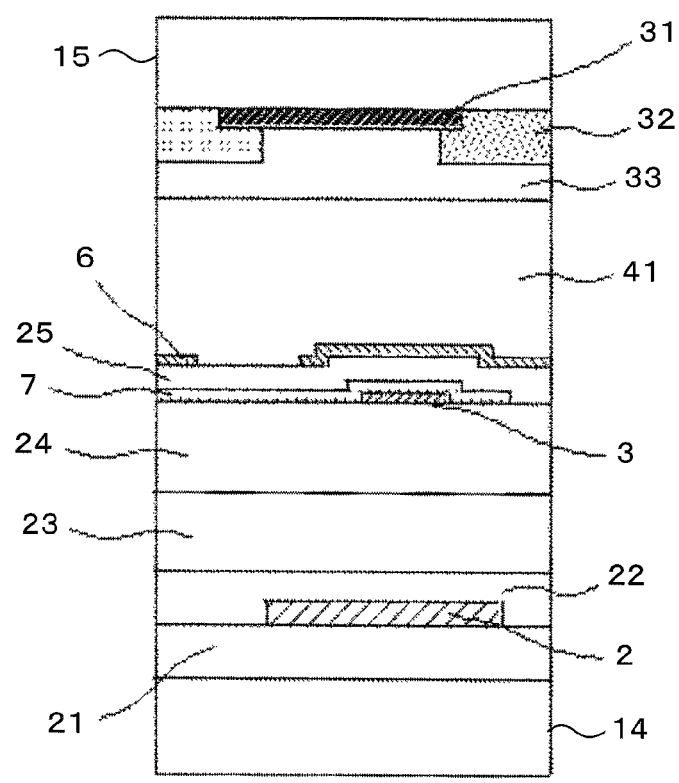

LIQUID CRYSTAL DISPLAY APPARATUS

CROSS-REFERENCE TO RELATED APPLICATIONS

This non-provisional application claims priority under 35 U.S.C.§119(a) on Patent Application No. 2014-150345 filed in Japan on Jul. 24, 2014, the entire contents of which are hereby incorporated by reference.

TECHNICAL FIELD

The present invention relates to a liquid crystal display apparatus, and specifically, to a structure of display pixels in a lateral electric field type liquid crystal display apparatus.

BACKGROUND

A structure and an operation of a conventional lateral electric field type liquid crystal display element, and problems thereof will described with reference to FIGS. 1A to 1C. FIG. 1A is a plan view of an element, and FIGS. 1B and 1C are cross-sectional views of the element illustrated in FIG. 1A. The conventional lateral electric field type liquid crystal display element includes: a TFT substrate 14 on which signal wirings 1, scanning wirings 2, pixel electrodes 6, counter electrodes 7, and the like, which generates an electric field to drive a liquid crystal, are disposed; a color filter substrate 15 on which a black matrix 31, a color filter element 32 and an overcoat layer 33 are disposed, the color filter substrate 15 facing the TFT substrate 14; and a liquid crystal 41 which is provided between the TFT substrate 14 and the color filter substrate 15.

In the conventional lateral electric field type liquid crystal display element, as described in Japanese Patent No. 4858820, in order to shield an electric field leaking from the signal wirings 1, an upper side of the signal wiring 1 is covered with upper electric field shield electrode (hereinafter referred to as an "upper shield COM electrode 5") having a common potential (hereinafter referred to as a "COM potential") so as to cover the signal wiring 1 with being superposed thereon through an insulation film such as an inorganic insulation film 23, organic insulation film 24, and a lower electric field shield electrode (hereinafter referred to as a "lower shield COM electrode 104") extend on a lower side of the signal wiring 1 parallel to an extending direction of the signal wiring 1 adjacent to both sides of the signal wiring. The above-described conventional lower shield COM electrode 104 is formed of a metal wiring by using the same process as the process of forming the scanning wiring 2 in the same layer as the scanning wiring 2 through a gate insulation film 22 with respect to the signal wiring 1.

SUMMARY

In the case of the above structure, the upper shield COM electrode 5 on the upper side of the signal wiring is formed of a transparent conductive film by using the same process as that of forming the counter electrode 7 in the same layer as the counter electrode 7, and the upper shield COM electrode 5 and the counter electrode 7 are formed by connecting or integrally formed with each other.

The counter electrode 7 is an electrode for generating an electric field to drive liquid crystal molecules, therefore, it is necessary to be less affected by the potential variation of other wirings. Since the upper shield COM electrode 5 is disposed with a thick organic insulation film 24 having a low relative permittivity etc. arranged between the upper shield COM electrode 5 and the signal wiring 1, a capacitance thereof with the signal wiring 1 is small and is less affected even if the potential of the signal wiring 1 is varied, and thereby causing minimal potential variation. Thus, it is possible to electrically connect the counter electrode 7 and the upper shield COM electrode 5 directly to each other, which may greatly affect image quality due to a minute potential variation.

Meanwhile, the lower shield COM electrode 104 having the conventional structure is formed in the same layer as the scanning wiring 2, and therefore, the insulation film arranged between the signal wiring 1 and the lower shield COM electrode 104 includes only the gate insulation film 22 for forming a switching element 13 which includes a gate electrode, the signal wiring 1, a source electrode 11, and a semiconductor 12.

The gate insulation film 22 needs to secure characteristics of the switching element 13 and has a relatively thin thickness. Further, the capacitance between the signal wiring 1 and the lower shield COM electrode 104 may be easily increased. Accordingly, if the signal wiring 1 and the lower shield COM electrode 104 are superposed or come into contact with each other in a direction parallel to the substrate, the lower shield COM electrode 104 is affected by voltage variation of the signal wiring 1, and thereby the potential thereof may be easily varied.

If the potential of the lower shield COM electrode 104 is varied, the electric field generated from the lower shield COM electrode 104 acts on the liquid crystal 41 in the pixel to change transmittance of the pixel, and thereby the display quality is deteriorated. In addition, as described above, since the capacitance between the signal wiring 1 and the lower shield COM electrode 104 is large, the load on the signal wiring 1 is also increased, thereby causing a problem such as a delay in the signal.

Further, in order to decrease the influence of above-described problems, there is a need to decrease the capacitance between the signal wiring 1 and the lower shield COM electrode 104. For this, it is necessary to increase a distance between the signal wiring 1 and the lower shield COM electrode 104 in a horizontal direction of the substrate, and therefore, an unnecessary space is formed between the signal wiring 1 and the lower shield COM electrode 104 in the horizontal direction of the substrate, which causes a decrease in an opening area of the pixel.

Moreover, since the conventional lower shield COM wiring (lower shield COM electrode 104 illustrated in FIG. 2A) is formed in the same layer as the scanning wiring 2, it is not possible to intersect the scanning wiring 2. Thus, there is no choice but to make a structure of supplying a voltage from a main COM wiring 3 which extends parallel to the extending direction of the scanning wiring 2, and is formed in the same process as the scanning wiring 2.

Herein, it is necessary for the main COM wiring 3 having the conventional structure to supply the voltage to the lower shield COM electrode 104, the counter electrode 7, the upper shield COM electrode 5 and a COM electrode 108 for forming a storage capacitor within a display region. However, when the wiring resistance of the main COM wiring 3 is high, a voltage supply capacity thereof is insufficient due to the delay in the signal, or the like, and the potential of the lower shield COM electrode 104 may be easily varied in conjunction with the potential variation of the signal wiring 1, and crosstalk in a direction of the signal wiring 1 may easily occur.

In addition, as described above, in the conventional structure, it is necessary for the main COM wiring 3 to supply the voltage to the various electrodes, and in order to secure the voltage supply capacity, wirings having a wide width are required. Thereby, the opening area is decreased, and the area of an intersection portion between the signal wiring 1 and the main COM wiring 3 is increased. Therefore, a large capacitance occurs between the signal wiring 1 and the main COM wiring 3, and the load on the signal wiring 1 is increased, thereby causing a delay in a data signal.

Moreover, since the lower shield COM electrode 104 and the main COM wiring 3 are connected to each other within the display region, when the potential of the lower shield COM electrode 104 which is capacitively coupled to the signal wiring 1 is varied due to the potential variation of the signal wiring 1, the potential of the main COM wiring 3 connected to the lower shield COM electrode 104 is also varied. Therefore, the potential of the COM electrode 108 for forming the storage capacitor (see FIG. 2A) and the counter electrode 7, which are also connected to the main COM wiring 3 within the display region and are sensitive to the potential variation, is also varied, and thus, the crosstalk in the direction of the scanning wiring 2 and coloring in a special screen may easily occur.

Further, in the related art, even when making a structure in which the main COM wiring 3 is provided on the upper side of the signal wiring 1 such that the main COM wiring 3 and the scanning wiring 2 are separately arranged in layers different from each other, it is necessary for the lower shield COM electrode 104 to be disposed on the lower side from the signal wiring 1. Therefore, in order to allow the lower shield COM electrode 104 to be supplied with the voltage from the main COM wiring 3 within the display region, securing conduction therebetween through a contact hole (COM) 9 in the display region i.e. a pixel region is required, which cause a decrease in the opening area for the space of the contact hole, conduction failure, and short-circuit failure.

Next, a specific operation and effect for an example of the problems entailed in the conventional configuration will be described with reference to FIGS. 2A to 6. FIG. 2A is a view illustrating a conventional pixel configuration, and FIG. 2B is a view describing a simplified pixel structure of the present invention.

In the conventional pixel configuration, the main COM wiring 3 is disposed so as to extend in the extending direction of the scanning wiring 2, the lower shield COM electrode 104 is disposed close to both sides of the signal wiring 1 in the extending direction of the signal wiring 1, and the lower shield COM electrode 104 and the main COM wiring 3 are electrically connected to each other within the pixel.

Although not illustrated in FIGS. 2A and 2B, a switching element is disposed adjacent to the portion in which the signal wiring 1 and the scanning wiring 2 intersect, and an image signal voltage applied to the signal wiring 1 is supplied to a pixel electrode 6 through the switching element and a contact hole (pixel) 10, to drive the liquid crystal by the electric field generated due to a potential difference between the pixel electrode 6 and the counter electrode 7 connected to the main COM wiring 3.

FIG. 3A is a view illustrating an electrical circuit of the conventional pixel configuration, and FIG. 3B is a view describing a simplified electric circuit of the pixel configuration of the present invention.

In the conventional pixel configuration, since the main COM wiring 3, the COM electrode 108 for forming the storage capacitor, the counter electrode 7, and the lower shield COM electrode 104 are connected at a low-resistance or integrally formed with each other in the display region, when illustrating in an electrical circuit diagram, these components are equivalent to the main COM wiring 3. Meanwhile, in the pixel structure of the present invention, the lower shield COM wiring 4 is a wiring aside from the main COM wiring 3 as an electric circuit.

Since a strong capacitive coupling is formed between the lower shield COM electrode 104 and the signal wiring 1, the potential of the lower shield COM electrode 104 may be also varied due to an effect of the potential variation of the signal wiring 1. When the potential variation of the lower shield COM electrode 104 occurs as described above, the lower shield COM electrode 104 having the conventional structure is connected to the main COM wiring 3 at a low-resistance so as to be supplied with the voltage from the main COM wiring 3, and therefore the potential of the main COM wiring 3 is also varied.

Since the lower shield COM electrode 104 functions to shield the electric field generated from the signal wiring 1, it does not significantly affect the image quality with regard to instantaneous potential variation. However, other electrodes connected to the main COM wiring 3, in particular, the COM electrode 108 for forming the storage capacitor significantly affect the image display even during small potential variation, because the potential variation in a short period in which the pixel voltage is applied to the pixel significantly affects the liquid crystal during voltage holding.

For example, in a dot inversion driven color liquid crystal display (LCD) having a stripe arrangement as illustrated in FIG. 4, when white/black vertical stripe patterns are displayed on the whole of a screen, a negative-polarity potential with respect to the COM potential is applied to green pixels at a time when a positive-polarity potential with respect to the COM potential is applied to red pixels and blue pixels in a bright display state.

In the above description, the lower shield COM electrode 104 causes a potential variation following the potential variation of the plurality of signal wirings 1, but there are two signal wirings 1 connected to the red pixels and the blue pixels as the signal wiring 1 whose potential is varied in a positive polarity, whereas there is only one signal wiring 1 connected to the green pixel as the signal wiring 1 whose potential is varied in a negative polarity, such that the potential of the lower shield COM electrode 104 is varied in a positive polarity direction on average. Therefore, the potential of the main COM wiring 3 having the same potential as the lower shield COM electrode 104, the counter electrode 7 connected to the main COM wiring 3, and the COM electrode 108 for forming the storage capacitor is also varied in the positive polarity direction.

FIG. 5 illustrates the pixel voltage and COM voltage of each pixel when the COM potential is not varied. In this case, as the potential difference between the pixel voltage applied to the pixel electrode of each pixel and the COM voltage, that is, the voltage applied to the liquid crystal, 5V is applied to the bright display pixels which are white stripe parts, while 0V is applied to dark display pixels which are black stripe parts, and differences do not occur in the red pixels, the green pixels and the blue pixels. However, in practice, as described above, in a special screen such as a vertical stripe screen, since the polarity of the voltage applied to the signal wiring 1 is biased, the COM voltage is also varied due to the effect thereof.

FIG. 6 illustrates the pixel voltage and COM voltage of each pixel when the COM potential is varied. In this case, at a time when the main COM wiring 3 is shifted in the positive polarity direction, in the red pixels and the blue pixels in which the positive-polarity potential is applied in the same direction as the potential variation of the main COM wiring 3 as a pixel voltage, the potential difference between the pixel electrode and the COM electrode for forming a storage capacitor is reduced. Therefore, the voltage stored in the storage capacitor 8 is shifted to the low-voltage side. Meanwhile, in the green pixels in which the negative-polarity potential is applied at the same time, the voltage stored in the storage capacitor 8 is shifted to the high voltage side.

As a result, in the case of a normally black type display system, luminance of the green pixels is higher than those of the red and blue pixels, and a chromaticity of the displayed screen is tinted slightly green. On the contrary, in the case of a normally white type display system, since the luminance of the green pixels is lower than those of the red and blue pixels, a problem occurs that the chromaticity of the screen is tinted slightly magenta.

It is an object of the present invention to solve the above-mentioned problems, and specifically, to provide a liquid crystal display apparatus capable of decreasing delay in the signal of each wiring and controlling the phenomenon of crosstalk and coloring with a high aperture ratio.

The present invention is a lateral electric field type liquid crystal display apparatus, comprising: a first substrate on which pixels are disposed in a matrix shape, each of the pixels including a plurality of signal wirings and a plurality of scanning wirings which intersect each other, a switching element provided in a region adjacent to a portion in which the signal wiring and the scanning wiring intersect or on the scanning wiring, a pixel electrode connected to the switching element, and a counter electrode to which a common potential is supplied from a common potential wiring; a second substrate which is provided to face the first substrate; and a liquid crystal which is provided between the first substrate and the second substrate, wherein a first electric field shield electrode, which is set to the common potential, is provided between the signal wiring and the first substrate, and the first electric field shield electrode is electrically connected with a first wiring which supplies the common potential to the first electric field shield electrode, within a display region in which the pixels are disposed in a matrix shape, and an electric field substantially parallel to the first substrate is applied between the pixel electrode and the counter electrode.

As described above, the first electric field shield electrode (first wiring) which may be easily affected by the voltage variation of the signal wiring and the common potential wiring are electrically separated from each other within the display region without connecting, such that even when the voltage of the first wiring is varied, the voltage variation of the common potential wiring is unlikely to occur.

In addition, it is also possible to control voltage variation in the counter electrode and the COM electrode for forming the storage capacitor which are directly connected to the common potential wiring within the display region, and reduce the above-described phenomenon of crosstalk or coloring in the special screen.

Further, in the present invention, a second electric field shield electrode, to which the common potential is supplied from the common potential wiring, is provided so as to be superposed on the signal wiring through an insulation film between the signal wiring and the liquid crystal.

Since it is necessary to concurrently supply the common potential to the first electric field shield electrode and the second electric field shield electrode, when concurrently supplying the voltage from the common potential wiring to the both electrodes, there is a need to secure conduction by providing a contact hole for supplying the voltage to either or both of the electrodes in the insulation film within the pixel.

According to the present invention, it is possible to electrically separate a path for supplying the voltage to the first electric field shield electrode and a path for supplying the voltage to the second electric field shield electrode from each other, thereby the contact hole for supplying the common potential into the pixel may be omitted.

Therefore, it is possible to reduce a space required for forming the contact hole, and secure a large opening area of the pixel, as well as it is possible to control step disconnection of wirings due to abnormal shape of the contact hole and a step of the contact hole, deterioration in quality due to an increase in contact resistance, or a decrease in yield.

Furthermore, in the present invention, the switching element is an inverse staggered type TFT element, the first electric field shield electrode is disposed between the scanning wiring and the first substrate, and an insulation film is provided between the scanning wiring and the first electric field shield electrode.

The first electric field shield electrode is disposed between the scanning wiring and the first substrate, and an insulation film (preferably, an insulation film including at least a silicon oxide film) made of any material having any thickness is disposed between the scanning wiring and the first electric field shield electrode, such that the capacitance between the signal wiring and the first electric field shield electrode may be reduced, and even when the potential of the signal wiring is varied, the potential variation of the first electric field shield electrode may be reduced.

Therefore, an occurrence of the electric field from the first electric field shield electrode itself may be controlled, effects on the electric field applied to the liquid crystal may be decreased, and the image quality may be improved. Further, the electrostatic capacitive load on the signal wiring is reduced, such that the time constant of the signal wiring may be decreased, and the delay in image data signal may be reduced.

Moreover, even when the signal wiring and the first electric field shield electrode are close to or superposed with each other in the plane direction of the substrate, it is difficult for an increase in the load of the wiring due to the capacitance to occur, such that it is not necessary to provide a space between the signal wiring and the first electric field shield electrode in the plane direction of the substrate, and it is possible to secure a large opening area of the pixel by as much as that of the space.

Moreover, the first wiring can be disposed on a layer different from the layer on which the common potential wiring is disposed, and can be electrically separated therefrom, such that it is possible to reduce the load on the common potential wiring, and the load on the first wiring, respectively, and control an occurrence of the crosstalk due to the delay in the signal of the wirings.

Since the load on the common potential wiring can be reduced, the common potential wiring may be thinned, and a large opening area of the pixel may be secured, as well as since the area of the portion in which the signal wiring and the common potential wiring intersect may be reduced, the capacitance between both wirings may be decreased, and the load on the signal wiring may be reduced.

In addition, in the present invention, the first wiring is provided in a direction in which the signal wiring extends, or is provided in both of the direction in which the signal wiring extends and a direction in which the scanning wiring extends. Further, the first electric field shield electrode covers the signal wiring, when viewed from a normal direction of the first substrate.

The signal wiring, the first wiring and the scanning wiring of the present invention are disposed on layers different from each other through the insulation films. Therefore, the first wiring for the first electric field shield electrode of the present invention can extend in the extending direction of the signal wiring while intersecting the scanning wiring, such that it is possible to supply the COM voltage from a side of a pressure contact terminal for the signal wiring, and improve the supply capacity of the COM voltage.

Moreover, when disposing the first wiring in the direction in which the signal wiring extends, according to the present invention, by connecting both ends of the first electric field shield electrode for each pixel in series, it is possible to make a structure in which the first electric field shield electrode itself also severs as a part of the first wiring. Thereby, an increase in wiring arrangement area due to the addition of the voltage supply path to the first electric field shield electrode is small, and the opening area of the pixel is not substantially reduced.

According to the invention, it is possible to achieve a liquid crystal display apparatus capable of decreasing delay in the signal of each wiring and controlling the phenomenon of crosstalk and coloring with a high aperture ratio.

The reason is that, the first electric field shield electrode, which is set to the common potential, is provided between the signal wiring and the first substrate, and the first electric field shield electrode is electrically separated from the common potential wiring and the counter electrode within the display region.

The above and further objects and features will more fully be apparent from the following detailed description with accompanying drawings.

BRIEF DESCRIPTION OF THE SEVERAL VIEWS OF THE DRAWINGS

FIG. 7A is a plan view illustrating an element structure according to a first embodiment of the present invention.

FIG. 8B is a view illustrating the wiring example according to the first embodiment of the present invention.

FIG. 10A is a plan view illustrating an element structure according to a third embodiment of the present invention.

FIG. 11C is a cross-sectional view taken on line B-B' of FIG. 11A.

DETAILED DESCRIPTION

As described in the background, in order to shield the electric field leaking from the signal wiring, the structure, in which the upper shield COM electrode having a COM potential is disposed on the upper side of the signal wiring, and the lower shield COM electrode extending in parallel to the extending direction of the signal wiring is disposed on the lower side of the signal wiring which is the same layer as the scanning wiring, is used. In this structure, the lower shield COM wiring is formed in the same layer as the scanning wiring, and it is not possible to intersect the lower shield COM wiring with the scanning wiring, such that the voltage is supplied from the main COM wiring formed in the same process as the scanning wiring to the lower shield COM electrode. Meanwhile, it is necessary for the main COM wiring to supply the voltage to the counter electrode, the upper shield COM electrode and the COM electrode for forming the storage capacitor, in addition to the lower shield COM electrode in the display region. Therefore, when the potential of the lower shield COM electrode which is capacitively coupled to the signal wiring is varied due to the potential variation of the signal wiring, the potential of the main COM wiring connected to the lower shield COM electrode is also varied, and further the potential of the COM electrode for forming the storage capacitor and the counter electrode is also varied. Thereby, crosstalk in the direction of the scanning wiring or coloring in the special screen may easily occur.

Accordingly, in one embodiment of the invention, in order to shield the electric field leaked from the signal wiring, a lower shield COM electrode extending parallel to the signal wiring is disposed on a lower side (lower side from a scanning in the case of an inverse staggered type TFT structure) from the signal wiring, and a lower shield COM electrode is not electrically connected to an upper shield COM electrode provided to be superposed on the upper side of the signal wiring, a counter electrode, a COM electrode for forming a storage capacitor, and a COM wiring for supplying voltage to these electrodes in the display region, so as to supply a COM voltage to the lower shield COM electrode through an independent wiring path.

Embodiment 1

Figure 1A:
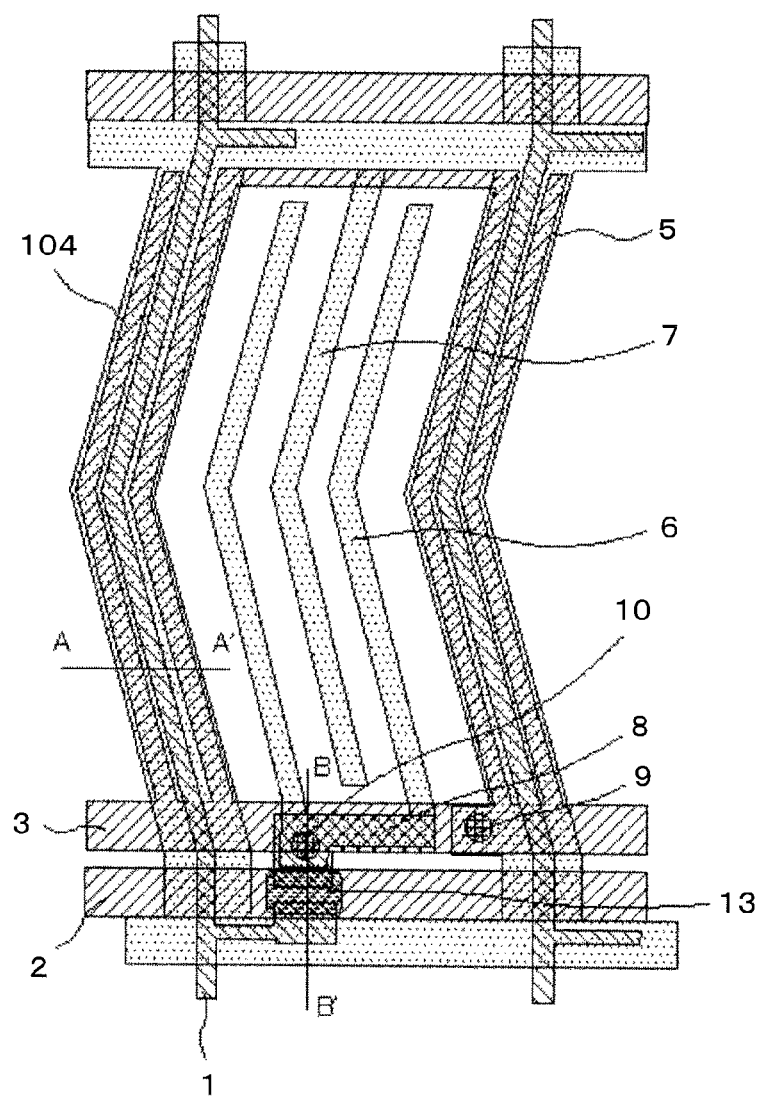
FIG. 1A is a plan view illustrating a pixel structure of a conventional lateral electric field type liquid crystal element.
Figure 1B:
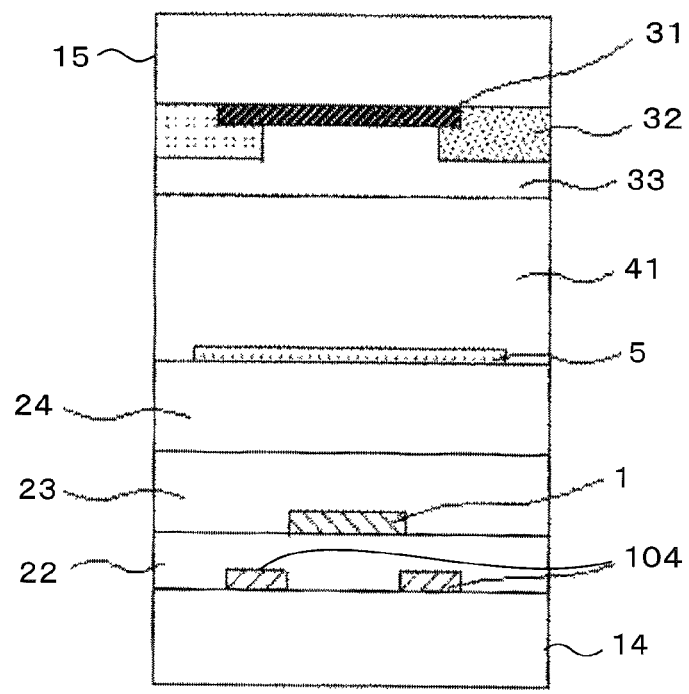
FIG. 1B is a cross-sectional view taken on line A-A' of FIG. 1A.
Figure 1C:
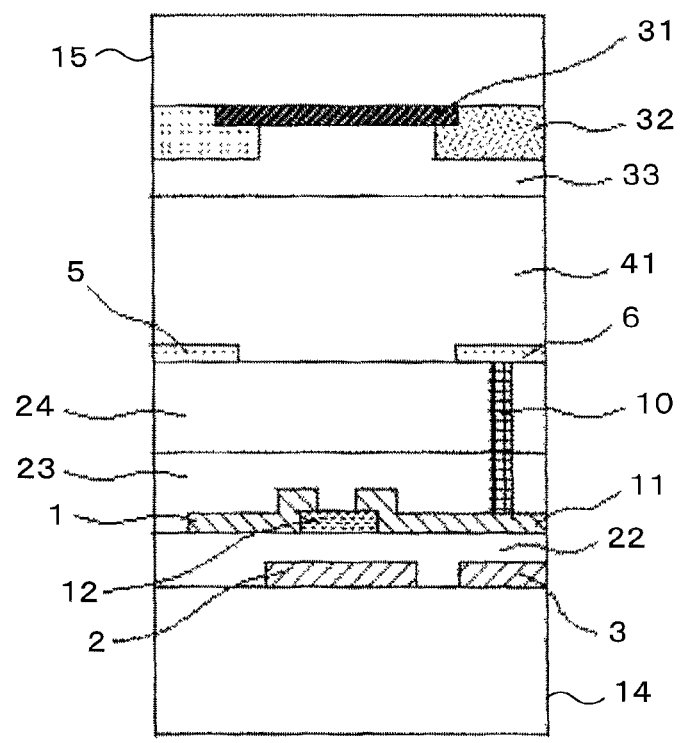
FIG. 1C is a cross-sectional view taken on line of B-B' of FIG. 1A.
Figure 2A:
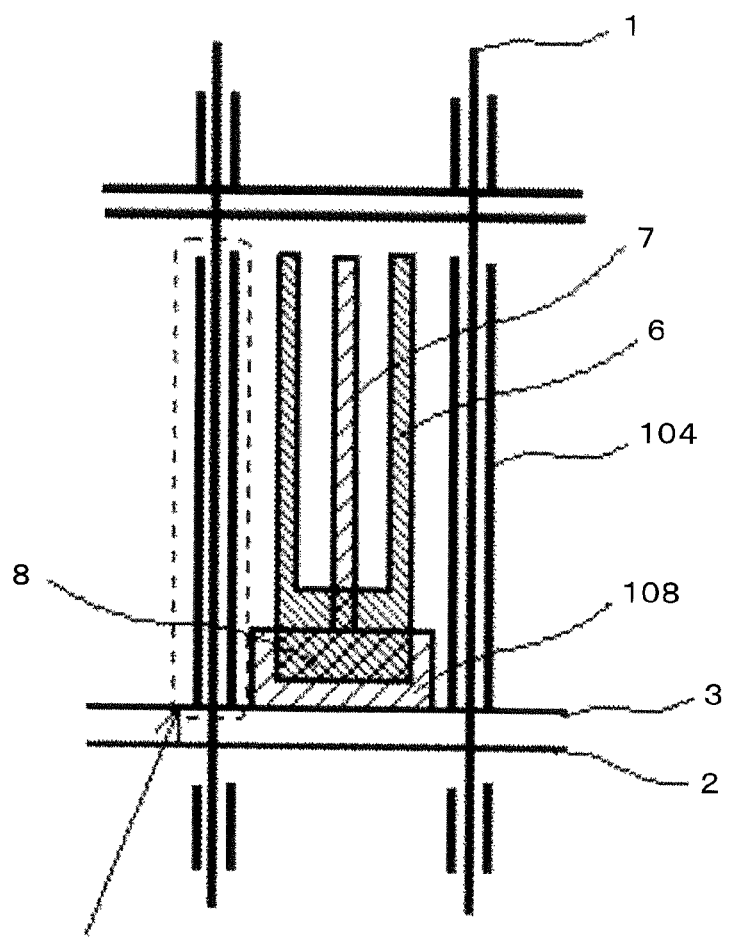
FIG. 2A is a view for comparing an element structure between the related art and an embodiment of the present invention, which is a simplified diagram of the pixel structure of a conventional lateral electric field type liquid crystal element.
Figure 2B:
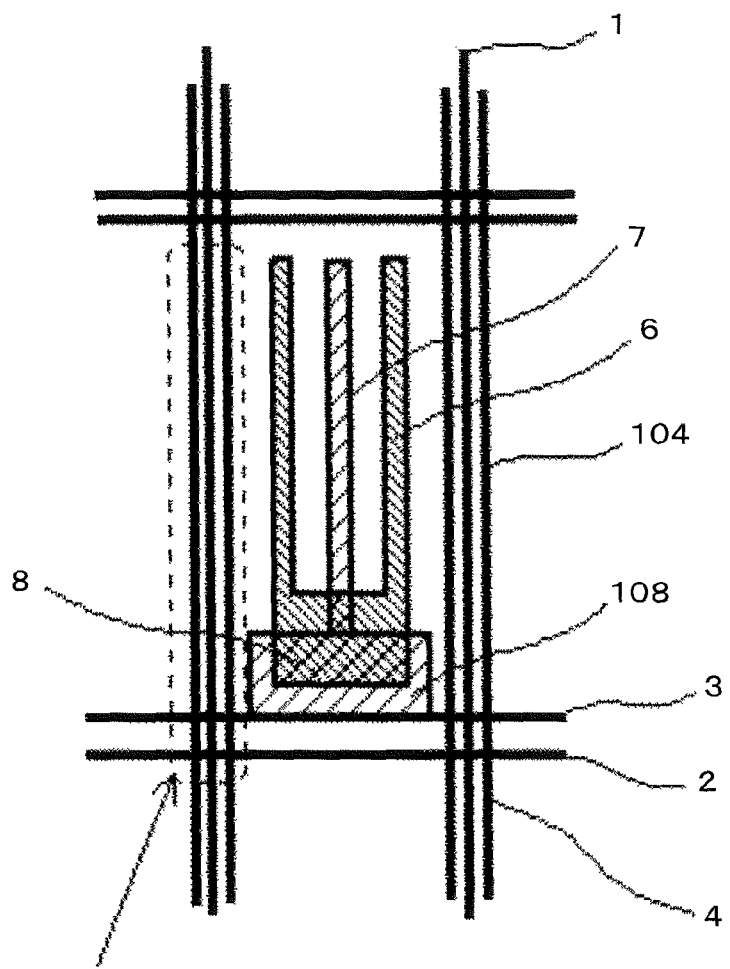
FIG. 2B is a view for comparing the element structure between the related art and the embodiment of the present invention, which is a simplified diagram of a pixel structure of an embodiment of the present invention.
Figure 3A:
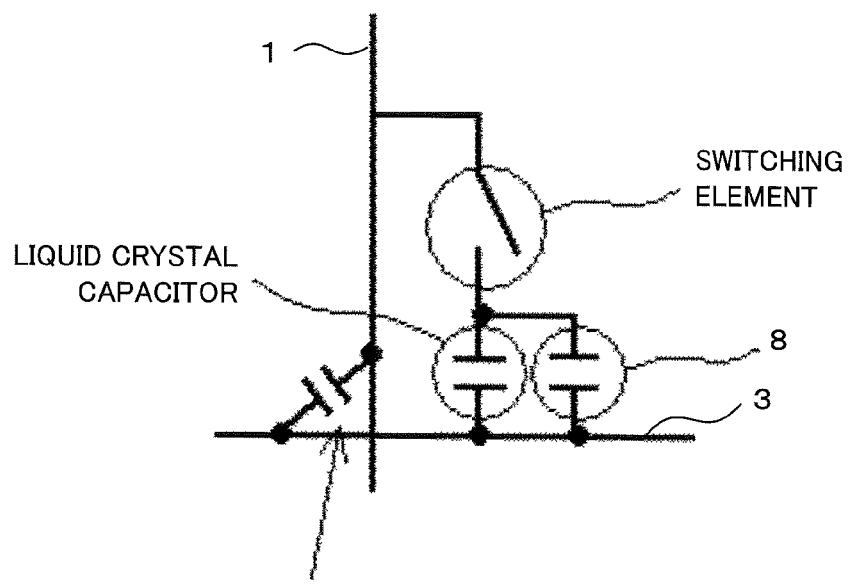
FIG. 3A is a view for comparing a circuit configuration between the related art and the embodiment of the present invention, which is a circuit diagram in which the pixel of the conventional common lateral electric field type liquid crystal element is not illustrated.
Figure 3B:
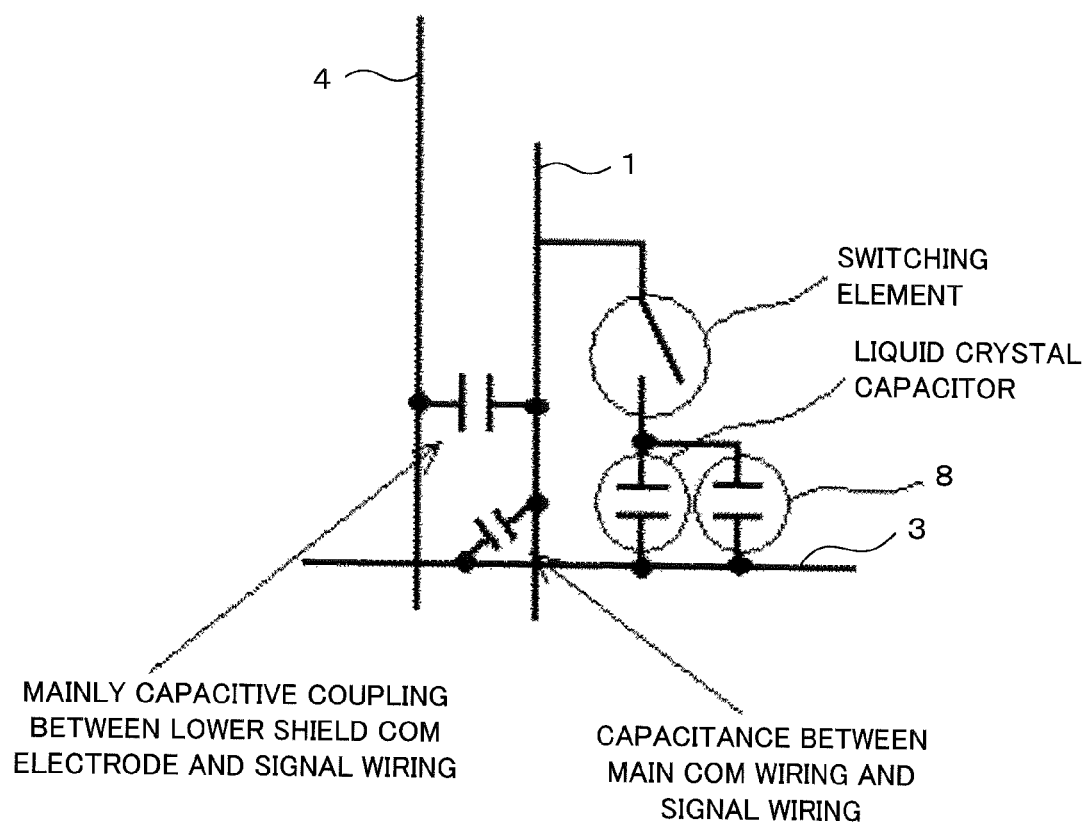
FIG. 3B is a view for comparing the circuit configuration between the related art and the embodiment of the present invention, which is a circuit diagram in which the pixel of the embodiment of the present invention is not illustrated.
Figure 4:
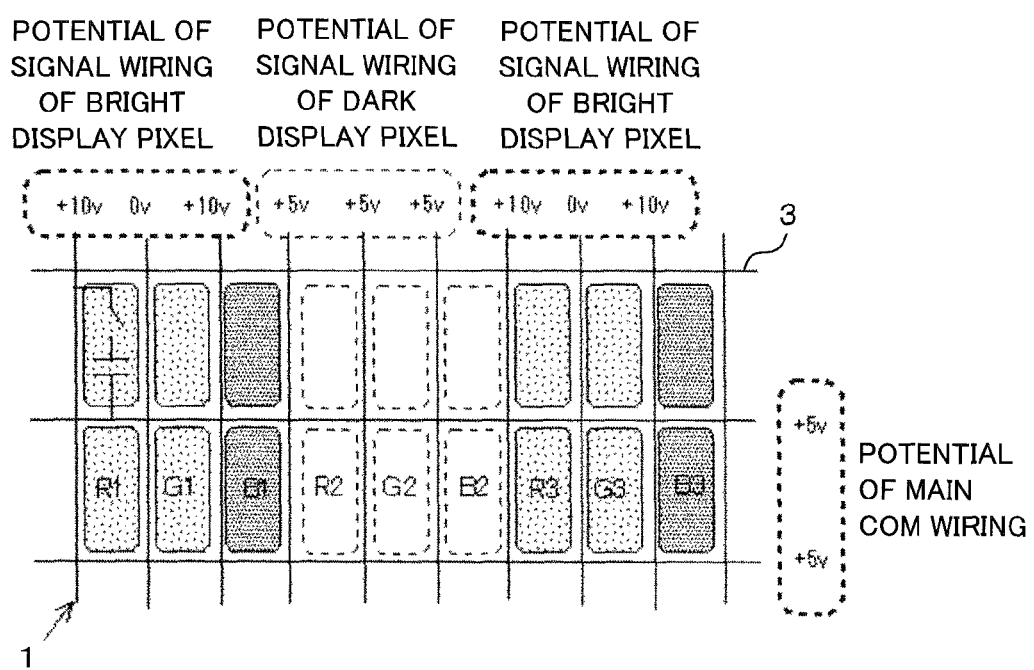
FIG. 4 is a view describing a coloring phenomenon in a special screen generated in the conventional pixel structure.
Figure 5:
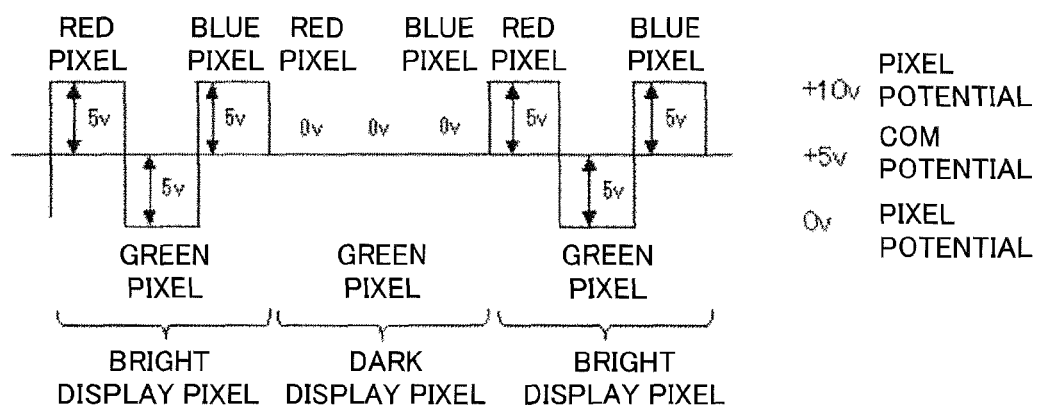
FIG. 5 is a view describing the coloring phenomenon in the special screen generated in the conventional pixel structure.
Figure 6:
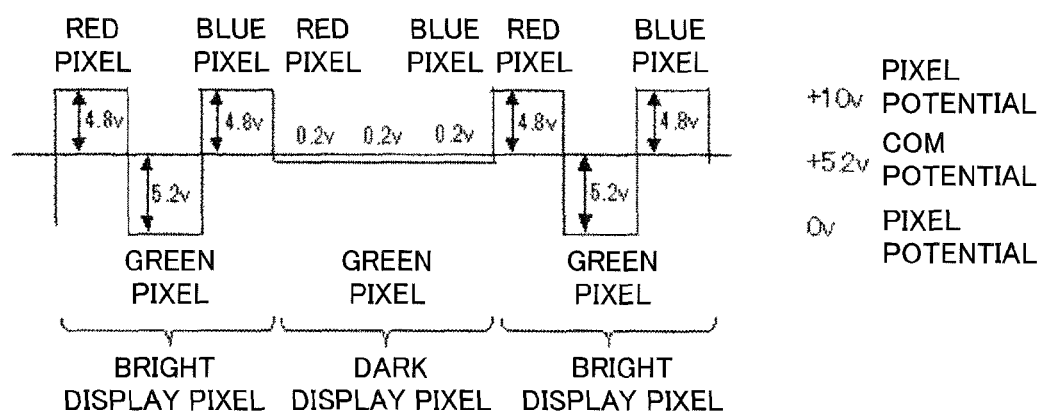
FIG. 6 is a view describing the coloring phenomenon in the special screen generated in the conventional pixel structure.
Figure 7B:
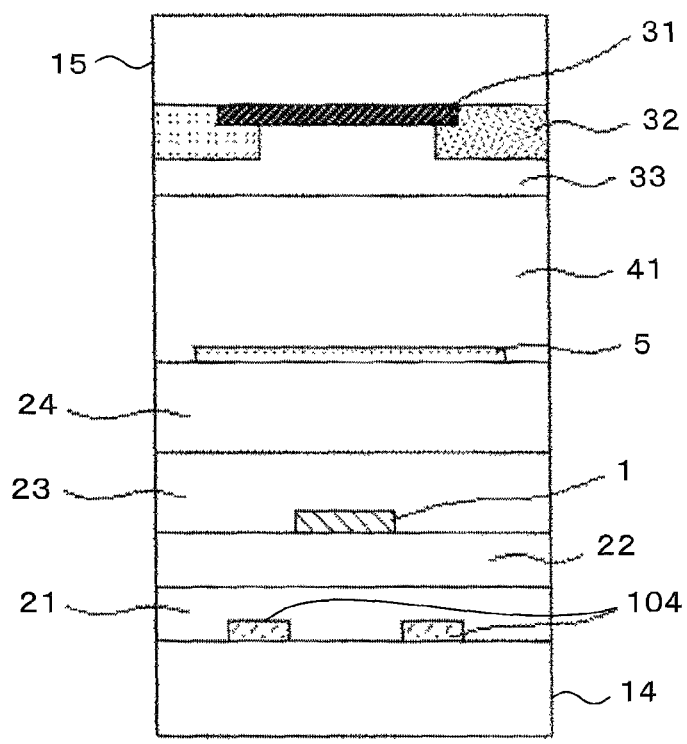
FIG. 7B is a cross-sectional view taken on line A-A' of FIG. 7A.
Figure 7C:
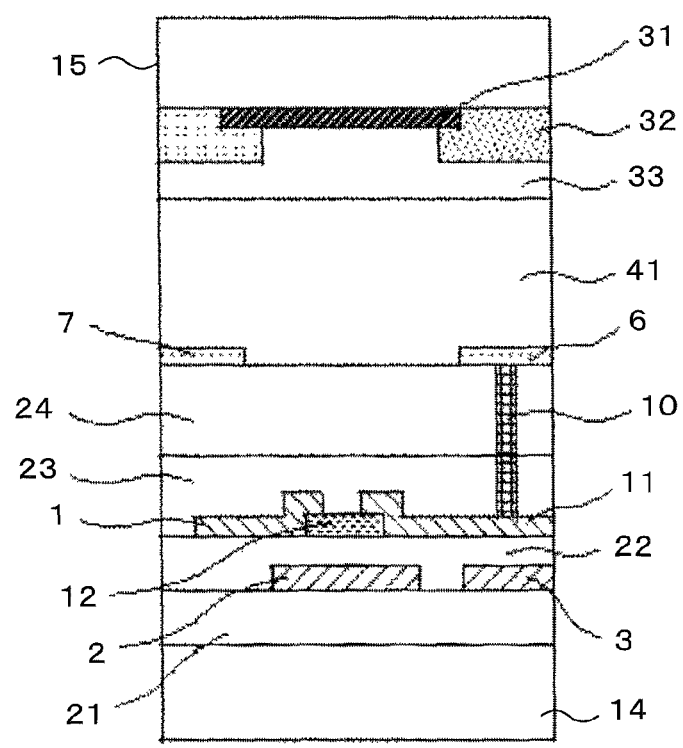
FIG. 7C is a cross-sectional view taken on line B-B' of FIG. 7A.
Figure 8A:
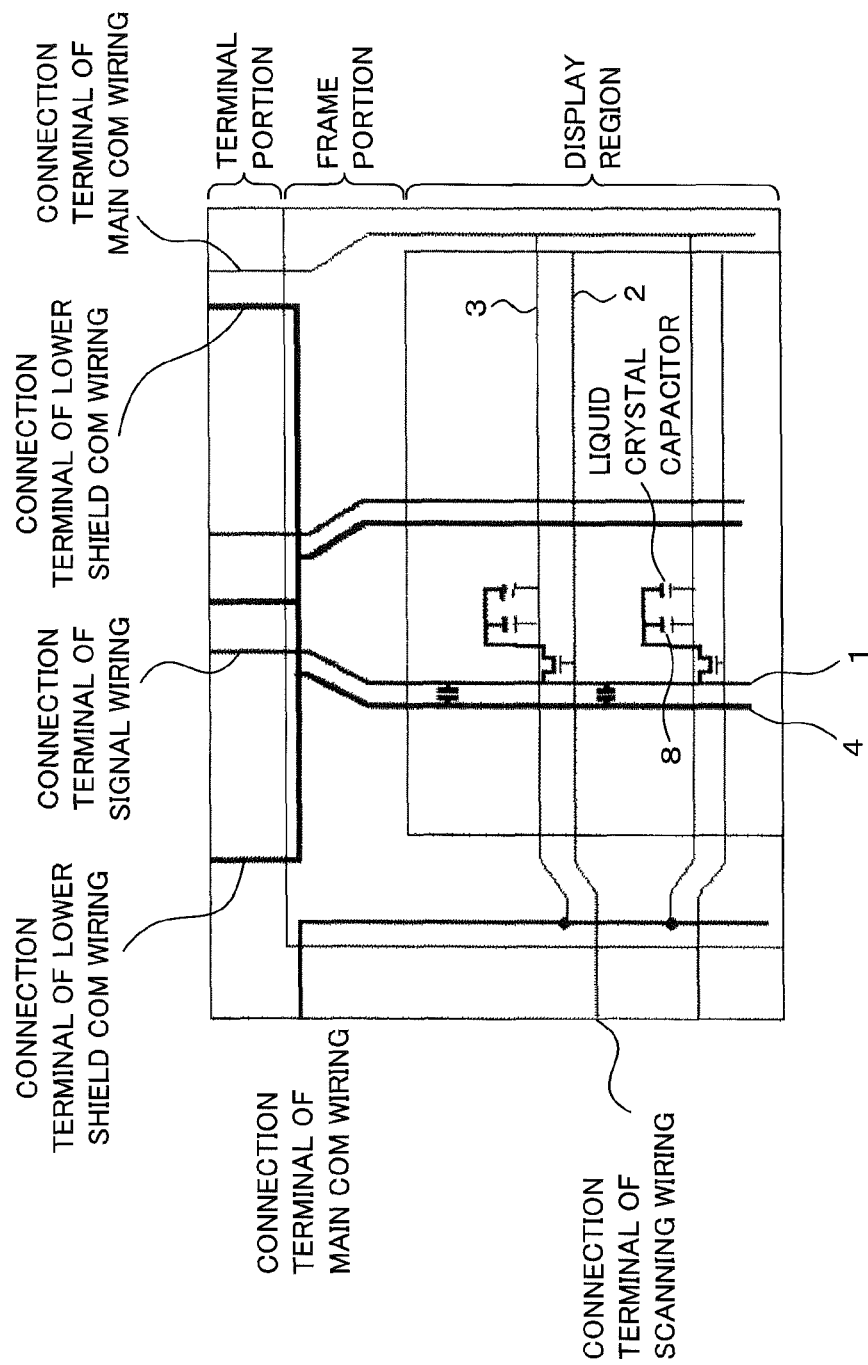
FIG. 8A is a view illustrating a wiring example according to the first embodiment of the present invention.

Hereinafter, the above-described embodiment of the present invention will be described in more detail. The structure of a liquid crystal display apparatus according to Embodiment 1 of the present invention will be described with reference to FIGS. 7A to 7C, and FIGS. 8A and 8B. FIG. 7A is a plan view of the present embodiment, and FIGS. 7B and 7C are cross-sectional views of FIG. 7A.

The liquid crystal display apparatus of the present embodiment includes: a transparent substrate (hereinafter referred to as a "TFT substrate" (first substrate)) 14 on which signal wirings 1, scanning wirings 2, pixel electrodes 6, counter electrodes 7, and the like, which generates an electric field to drive a liquid crystal, are disposed; a transparent substrate (hereinafter referred to as a "color filter substrate" (second substrate)) 15 on which a black matrix 31, a color filter element 32, and an overcoat layer 33 are disposed, the color filter substrate 15 facing the TFT substrate 14; and a liquid crystal 41 which is provided between the TFT substrate 14 and the color filter substrate 15.

In addition, the TFT substrate 14 includes the signal wiring 1 formed thereon to apply a signal voltage to the pixel electrode 6, and the scanning wiring 2 formed thereon to operate a switching element 13. A pixel region surrounded by the signal wiring 1 and the scanning wiring 2 further includes: the switching element 13 (inverse staggered type TFT element); a plurality of pixel electrodes 6 which are connected to the signal wiring 1 through the switching element 13 and a contact hole (pixel) 10, and are disposed in a comb shape; the counter electrode 7 which is disposed parallel to the extending direction of each pixel electrode 6, and generates an electric field between the pixel electrode 6 and the counter electrode 7; a main COM wiring (common potential wiring) 3 for supplying a common potential to the counter electrode 7; an upper shield COM electrode (second electric field shield electrode) 5 connected to the main COM wiring 3 through a contact hole (COM) 9; a lower shield COM electrode (first electric field shield electrode) 104 which is disposed on both sides of the signal wiring 1 in the extending direction of the signal wiring 1, and is formed on the lower side of the scanning wiring 2 through an lower insulation film 21; and a lower shield COM wiring (first wiring) 4 including the lower shield COM electrode 104.

The upper shield COM electrode 5 is formed of a transparent conductive film through an inorganic insulation film 23 and an organic insulation film 24 on the upper side from the signal wiring 1, by using the same process and in the same layer as the counter electrode 7, and is electrically connected to the main COM wiring 3 by the contact hole 9, to supply the COM voltage from the main COM wiring 3 to the upper shield COM electrode 5.

The upper shield COM electrode 5 is disposed to be superposed on the signal wiring 1. However, a thick insulation film having a low relative permittivity is disposed between layers in which the signal wiring 1 and the upper shield COM electrode 5 are respectively disposed, such that a capacitance between the wirings may be decreased. Thereby, it is possible to significantly decrease the effect of the potential variation due to a capacitive coupling between the signal wiring 1 and the upper shield COM electrode 5.

In the present embodiment, a part of the main COM wiring 3 also serves as a COM electrode for forming the storage capacitor, and a storage capacitor 8, which is a capacitor element, is formed at a portion in which a source electrode 11 of TFT, which is the switching element 13, or a part of the pixel electrode 6 and the main COM wiring 3 are superposed with each other.

The lower shield COM wiring 4, as illustrated in FIGS. 7A to 7C and FIG. 8A, intersects the main COM wiring 3 and the scanning wiring 2 through a lower insulation film 21, and extend along the signal wiring 1. In addition, a terminal of the lower shield COM wiring 4 is a connection terminal provided on an outer peripheral portion outside the display region of the LCD display element, and is directly supplied with the COM voltage from an external power source. Therefore, it is not necessary to provide a contact hole in the wiring path for supplying the COM voltage to the lower shield COM electrode 104 within the display region.

The terminal of the lower shield COM wiring 4 is not limited to the above-described structure, and as illustrated in FIG. 8B, it may be connected with the main COM wiring 3 at a frame portion outside the display region of the LCD display element. However, in this case, it is preferable that a resistance between a connection terminal for supplying the voltage from an external power supply to the main COM wiring 3 and a terminal connection part of the lower shield COM wiring 4 is set so as to be sufficiently lower than the wiring resistance within the display region of the main COM wiring 3.

The lower shield COM electrode 104 and the signal wiring 1 are electrically insulated from each other through the lower insulation film 21 and a gate insulation film 22. However, by using a silicon oxide film which is a material having a relatively low relative permittivity for the lower insulation film 21, and setting a thickness thereof to be increased, it is possible to set the capacitance between the signal wiring 1 and the lower shield COM electrode 104 so as to be decreased.

As described above, since it is possible to decrease the capacitance between the lower shield COM electrode 104 and the signal wiring 1, as illustrated in FIG. 7B, the lower shield COM electrode 104 may be disposed close to the signal wiring 1 in a plan direction.

Next, the operation and effect by the structure of the present embodiment will be described.

To drive the LCD display element, in general, a positive polarity voltage and a negative polarity voltage are alternately applied to the pixel electrode for each display frame, and therefore, the voltage applied to the signal wiring 1 is varied in a range from several volts (V) to several tens of volts (V).

The lower shield COM electrode 104 is disposed close to the signal wiring 1 in the extending direction of the signal wiring 1, such that the voltage of the lower shield COM electrode 104 is also slightly varied by the capacitive coupling between the lower shield COM electrode 104 and the signal wiring 1 depending on the voltage variation of the signal wiring 1. Moreover, since the voltage of the lower shield COM electrode 104 is varied, an electric field is slightly generated between the lower shield COM electrode 104 and the pixel electrode 6, and the generated electric field affects the driving of the adjacent liquid crystal, and thereby the crosstalk occurs.

For this problem, in the structure of the present embodiment, since it is possible to sufficiently secure a distance between the signal wiring 1 and the lower shield COM electrode 104 in a thickness direction thereof, the capacitance is small, and the voltage variation of the lower shield COM electrode 104 due to the voltage variation of the signal wiring 1 may be controlled, and thereby it is possible to obtain good display quality with a decreased crosstalk.

Further, conventionally, it is necessary for the signal wiring 1 to transmit a display signal at a high speed, and it is necessary to reduce the time constant which is determined by the wiring resistance and the wiring capacitance, such that there is a need to reduce the wiring resistance by increasing the wiring width. However, in the structure of the present embodiment, since it is possible to decrease the wiring capacitance as described above, as a result, the wiring width may be reduced, and the opening area of the pixel may be increased.

Moreover, since it is possible to set the capacitance between the signal wiring 1 and the lower shield COM electrode 104 so as to be decreased, the signal wiring 1 and the lower shield COM electrode 104 may be disposed close to or superposed with each other in the plan direction of the substrate, and there is no need to secure a space between the signal wiring 1 and the lower shield COM electrode 104, and thereby the opening area of the pixel may be increased.

Further, in the present embodiment, the lower shield COM wiring 4, in which the lower shield COM electrode 104 of each pixel and both ends of the lower shield COM electrode 104 are connected to each other in series, is disposed in the extending direction of the signal wiring 1 orthogonal to the main COM wiring 3.

To separate light transmitted through each display pixel, the lower shield COM wiring 4 is superposed with the black matrix 31 which is provided at a portion of the color filter substrate 15 superposed with the signal wiring 1 and the scanning wirings 2, and is formed of a material having light-shielding properties. Therefore, the opening area of the pixel is not decreased.

Also, for the main COM wiring 3, in addition to the capacitance generated between the signal wiring 1 and the main COM wiring 3, the parasitic capacitance of each element supplied with the voltage from the main COM wiring 3 also becomes the capacitive load of the main COM wiring 3, and thereby, the time constant thereof is increased. Therefore, it is also necessary for the main COM wiring 3 to control the delay in signal by increasing the wiring width to decrease the wiring resistance. However, in the structure of the present embodiment, the main COM wiring 3 and the lower shield COM electrode 104 are electrically disconnected from each other, such that the capacitance load applied to the main COM wiring 3 is decreased. Thereby, the wiring width may be reduced, and the opening area of the pixel may be increased.

Furthermore, since the COM voltage applied to the counter electrode 7 and a COM electrode 108 for forming the storage capacitor is directly related to the voltage for driving the liquid crystal, a slight voltage variation affects the display quality. Since the counter electrode 7 and the COM electrode 108 for forming the storage capacitor are supplied with the COM voltage from the main COM wiring 3, the voltage variation in the main COM wiring may affect the pixel quality.

In the conventional structure, since the main COM wiring 3 is connected with the lower shield COM electrode 104 having a relatively large potential variation within the display region, voltage variation may easily occur, and thereby causing a deterioration in the display quality such as the crosstalk. However, in the structure of the present embodiment, since the main COM wiring 3 and the lower shield COM electrode 104 are configured to be not electrically connected with each other in the display region, the voltage variation of the lower shield COM electrode 104 less affects the voltage of the main COM wiring 3, and thereby a deterioration in the display quality such as the crosstalk may be decreased.

Embodiment 2

Figure 9:
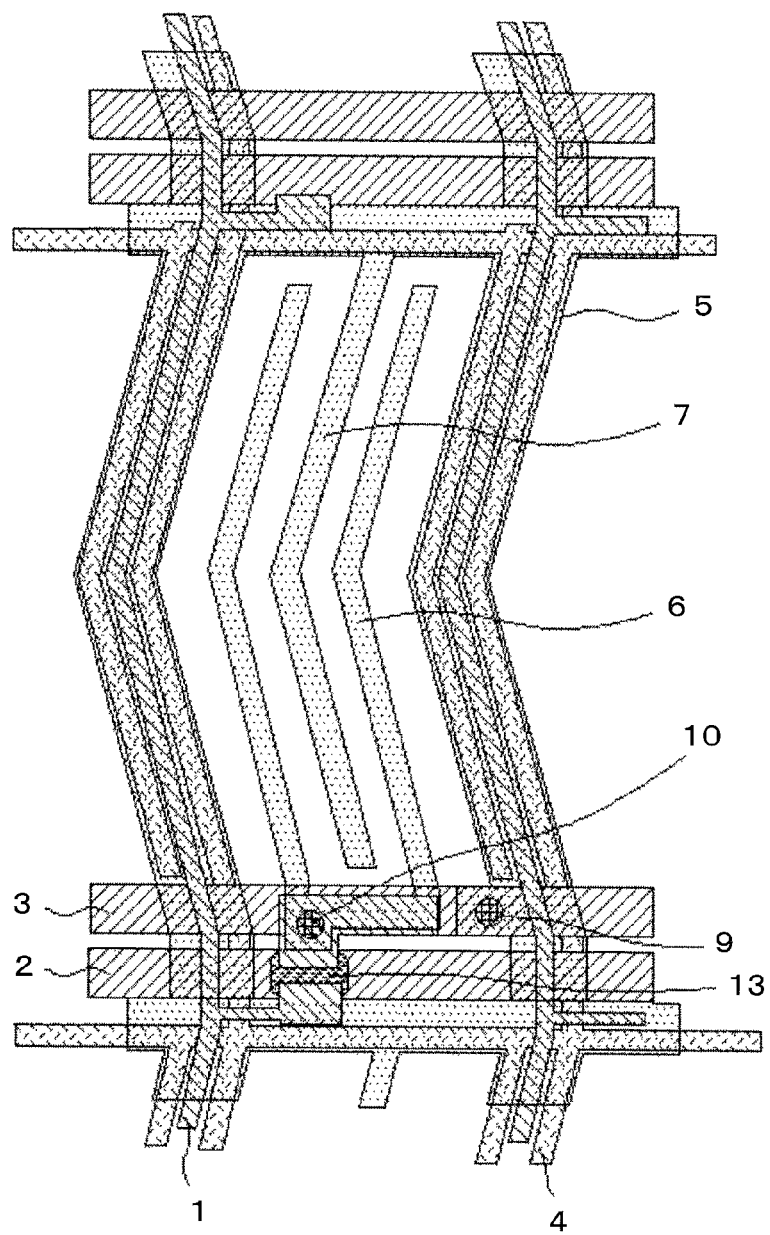
FIG. 9 is a plan view illustrating an element structure according to a second embodiment of the present invention.

Embodiment 2 which is other embodiment of the present invention will be described with reference to FIG. 9.

The present embodiment is characterized in that the lower shield COM wiring 4 is disposed in the extending direction of the signal wiring 1, and is also disposed in the extending direction of the scanning wiring 2 in the same layer, so as to provide a mesh-shaped wiring structure.

In the present embodiment, the signal wiring 1, the scanning wiring 2, and the lower shield COM wiring 4 are disposed in layers different from each other through insulation films, such that the respective layers may intersect with each other in a plan view, and constraints on the wiring arrangement may be reduced, thereby providing the mesh-shaped wiring structure.

By forming the lower shield COM wiring 4 in a mesh structure, the wiring resistance may be reduced, and the voltage of the lower shield COM electrode 104 is equalized, such that highly uniform display quality may be obtained.

In addition, it is possible to thin the wiring width due to a decrease in the wiring resistance of the lower shield COM wiring 4, and enlarge the opening area of the pixel.

Further, due to an increase in redundancy of the wirings, even when a part of the lower shield COM wiring 4 is disconnected, the display quality is not substantially affected.

Embodiment 3

Figure 10B:
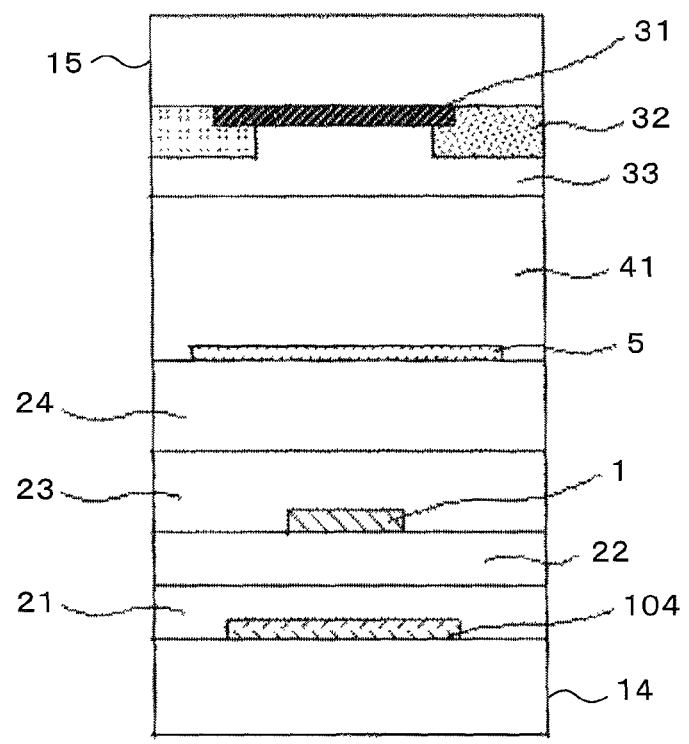
FIG. 10B is a cross-sectional view taken on line A-A' of FIG. 10A.

Embodiment 3 which is other embodiment of the present invention will be described with reference to FIGS. 10A and 10B. FIG. 10A is a plan view of the present embodiment, and FIG. 10B is a cross-sectional view taken on line A-A' of FIG. 10A.

The present embodiment is characterized in that the lower shield COM electrode 104 is disposed to be superposed on the lower side of the signal wiring 1 so as to completely cover the signal wiring 1 when viewed from the normal direction of the TFT substrate 14.

By disposing the signal wiring 1 between the upper shield COM electrode 5 and the lower shield COM electrode 104, the electric field generated from the signal wiring 1 may be almost completely shielded, and an image with higher display quality may be achieved.

Moreover, even when a position shift or a change in wiring width occurs during patterning the signal wiring 1 and the lower shield COM electrode 104, an area in which the wiring patterns of the signal wiring 1 and the lower shield COM electrode 104 are superposed with each other does not vary, such that a change in capacitance therebetween is small, and characteristics are stable.

In addition, when viewed from the normal direction of the substrate, there is no gap between the signal wiring 1 and the lower shield COM electrode 104, and light leakage does not occur, such that a decrease in contrast or an occurrence of crosstalk due to light leakage may be significantly controlled.

In the conventional structure, when the signal wiring 1 and the lower shield COM electrode 104 are superposed with each other, the capacitance therebetween is too large, and the load on the wirings is increased. Therefore, it is difficult to apply to, in particular, the LCD display element having a large screen. However, according to the present invention, the distance between the signal wiring 1 and the lower shield COM electrode 104 may be sufficiently separated from each other in a direction perpendicular to the substrate, and the capacitance therebetween may be arbitrarily decreased. Thus, it is possible to also apply to the LCD display element having a large screen.

Embodiment 4

Figure 11A:
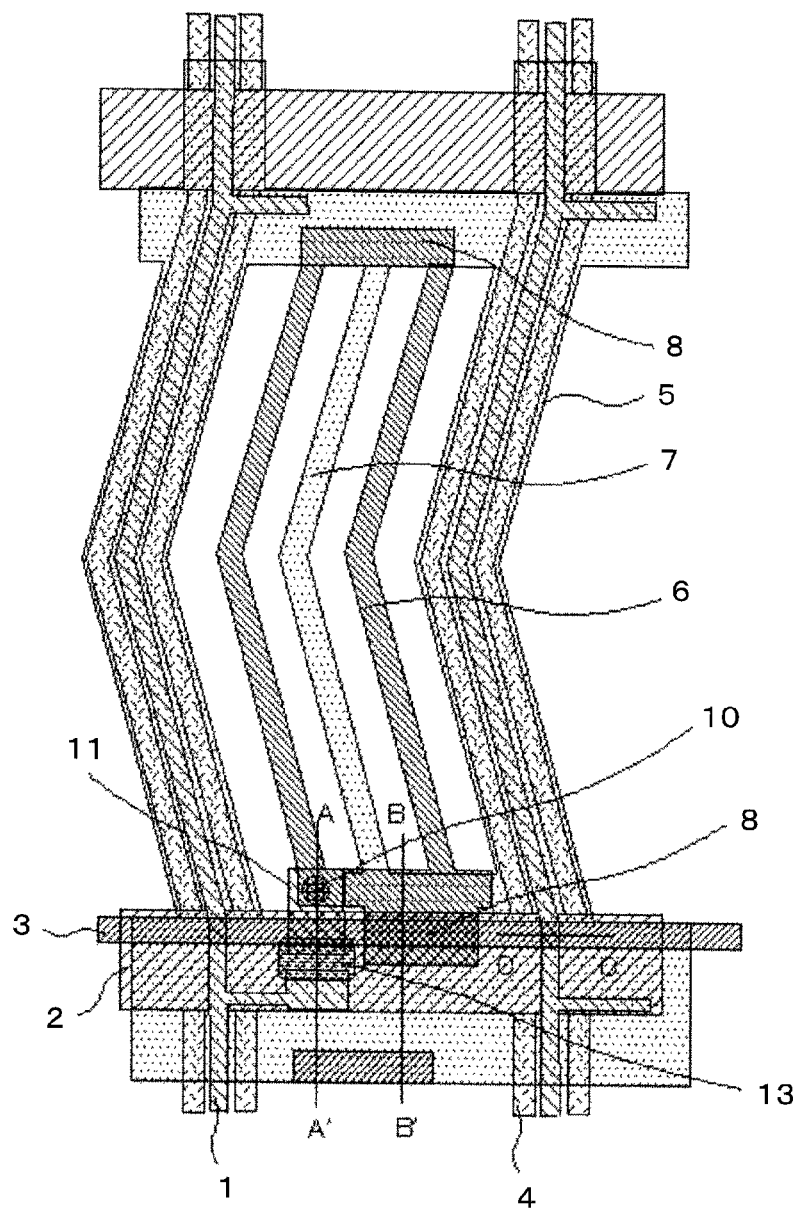
FIG. 11A is a plan view illustrating an element structure according to a fourth embodiment of the present invention.
Figure 11B:
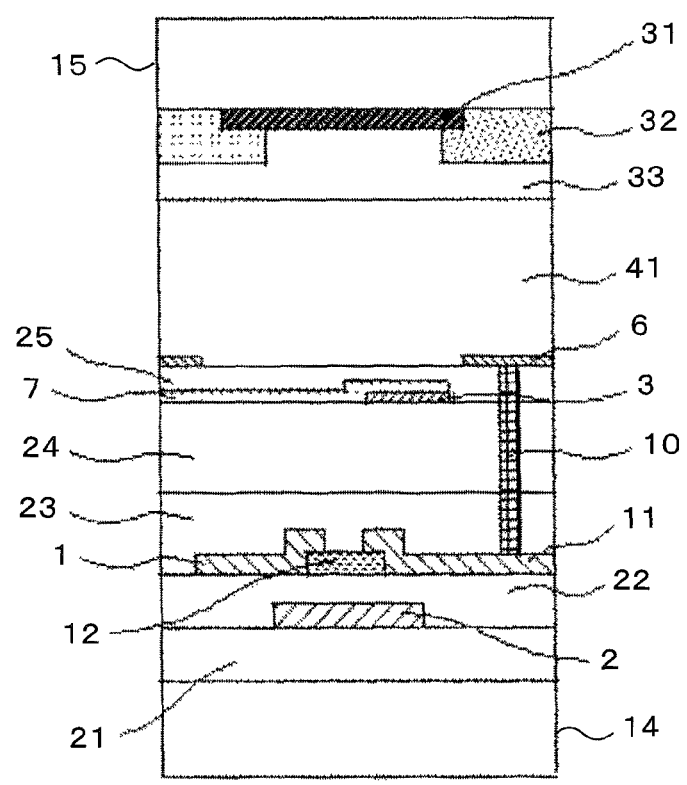
FIG. 11B is a cross-sectional view taken on line A-A' of FIG. 11A.
Figure 11D:
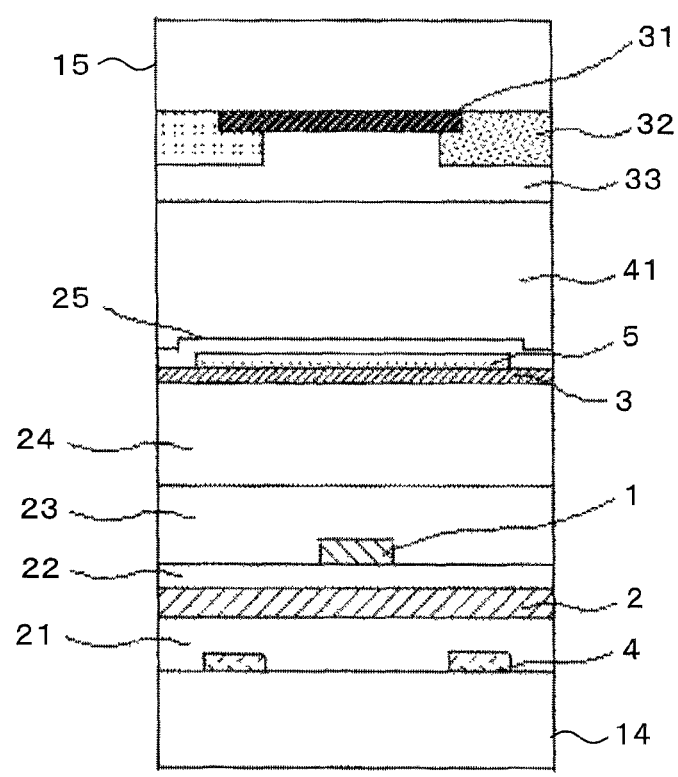
FIG. 11D is a cross-sectional view taken on line C-C' of FIG. 11A.

Example 4 which is other embodiment of the present invention will be described with reference to FIGS. 11A to 11D. FIG. 11A is a plan view of the present embodiment, and FIGS. 11B to 11D are cross-sectional views of FIG. 11A.

In the present embodiment, as an example of a method of manufacturing the liquid crystal display apparatus of the present invention, the method of manufacturing the liquid crystal display apparatus having a structure in which the main COM wiring 3 is provided on the upper side of the signal wiring 1, such that the main COM wiring 3 and the scanning wiring 2 are separately arranged in layers different from each other, will be described. Hereinafter, the manufacturing method of the present embodiment will be described in an order of laminating from the glass substrate.

First, the lower shield COM electrode 104 and the lower shield COM wiring 4 are formed of a low-resistance metal on a glass substrate. Then, the lower insulation film 21 is formed of silicon oxide, etc. thereon. The lower insulation film 21 may be formed by selecting a suitable thickness and material to decrease the capacitance between the signal wiring 1 which is disposed on the upper side of the lower insulation film 21 and the lower shield COM electrode 104, and may be formed as a laminated film. However, it is preferable that the lower insulation film contains silicon oxide.

Next, the scanning wiring 2 is disposed by using a low-resistance metal so as to be substantially orthogonal to the lower shield COM wiring 4.

Then, the gate insulation film 22 is formed of silicon nitride, etc. thereon. Since the gate insulation film 22 greatly affects the characteristics of the switching element 13, it is difficult to arbitrarily select the thickness and material thereof, and a relatively thin film having a high relative permittivity is selected.

The semiconductor 12 of amorphous silicon, etc. is disposed on the upper side of the gate insulation film 22 so as to be superposed on the above-described scanning wiring 2 or the gate electrode branched from the scanning wiring 2.

Thereafter, the signal wiring 1 is formed of a low-resistance metal thereon. The signal wiring 1 is provided by extending parallel to the extending direction of the lower shield COM wiring 4 so that the lower shield COM electrode 104 is disposed on both sides of the signal wiring 1. Further, a part of the signal wiring 1 is superposed with a part of the semiconductor 12 to form one terminal of the switching element 13. The source electrode 11 separated from the signal wiring 1 is formed to be superposed with a part of the semiconductor 12 in the same process as the signal wiring 1, to form another terminal of the switching element 13, and prepare the switching element 13 including the gate electrode, the signal wiring 1, the source electrode 11, and the semiconductor 12.

Then, the inorganic insulation film 23 intended to protect the switching element 13 is formed of silicon nitride, etc. on the upper side of the switching element 13.

Then, the organic insulation film 24 made of acrylic resin, etc. is formed thereon by using a method such as application. In order to decrease the capacitance between the signal wiring 1 disposed on the lower side thereof and the upper shield COM electrode 5 disposed on the upper side thereof, the organic insulation film 24 is formed with a relatively large thickness using a low-relative permittivity material. The organic insulation film 24 is made of a photosensitive resin, and a portion to be formed as a contact hole in a subsequent process and the vicinity thereof are previously removed, by using a photolithography method. It is also possible to form the contact hole by using the organic insulation film 24 as a resist pattern during forming the contact hole.

Next, the main COM wiring 3 is formed of a low-resistance metal thereon. Since the main COM wiring 3 is separated from other wirings by an insulation film, it is possible to dispose the same by extending in any one or both of the extending direction of the signal wiring 1 and the extending direction of the scanning wiring 2, and by being superposed with the signal wiring 1 and the scanning wiring 2.

Then, the upper shield COM electrode 5 and the counter electrode 7 are formed of a transparent conductive film such as indium tin oxide (ITO) thereon. Since the upper shield COM electrode 5 and the counter electrode 7 are set to the COM potential, these electrodes are provided by connecting to each other or in an integral shape. The upper shield COM electrode 5 is disposed so as to cover the signal wiring 1 for shielding the electric field from the signal wiring 1.

In addition, since the upper shield COM electrode 5 and the counter electrode 7 are superposed on the main COM wiring 3, it is possible to directly supply the COM voltage from the main COM wiring 3, without passing through the contact hole. In the present embodiment, the upper shield COM electrode 5 is laminated on the upper side of the main COM wiring 3, but the main COM wirings 3 may be superposed on the upper side of the upper shield COM electrode 5 by reversing the laminating order.

Then, the upper insulation film 25 is formed of silicon nitride, etc. thereon. It is preferable that the upper insulation film 25 is formed of a relatively thin material having a high relative permittivity, so as not to weaken the electric field generated between the counter electrode 7 and the pixel electrode 6, and secure the capacity of the storage capacitor 8 which is provided by superposing the counter electrode 7 and the pixel electrode 6 with each other.

Thereafter, in order to connect the electrodes and wires of each layer to each other, or to open the connecting terminal of the outer peripheral portion of the display apparatus, the contact hole is provided therein. In the present embodiment, the contact hole is provided after formation of the upper insulation film 25, but the process of forming the contact hole may be divided into several steps, and then may be performed after the formation of each insulation film.

Next, the pixel electrode 6 is formed of a transparent conductive film thereon. The counter electrode 7 and the pixel electrode 6 are formed by alternately disposing an elongated electrode parallel to each other. When applying different voltages between the counter electrode 7 and the pixel electrode 6, an electric field is generated in a direction at right angles to the extending direction of the electrode between the both electrodes, and thereby changing the alignment direction of liquid crystal molecules. Further, as described above, by superposing the pixel electrode 6 and the counter electrode 7 or a part of the main COM wiring 3 with each other through the upper insulation film 25, the storage capacitor 8 is formed. Furthermore, in the present embodiment, although the pixel electrode 6 is disposed on the upper side of the counter electrode 7 through the upper insulation film 25, these electrodes may also be formed by replacing the laminating order between the counter electrode 7 and the pixel electrode 6.

As described above, in the present embodiment, since the lower shield COM wiring 4 is drawn out as an independent wire to an outside of the display region, there is no need to connect the main COM wiring 3 within the display region.

In the structure of the present embodiment, in addition to the effects of other embodiments, effects may be obtained wherein the contact hole required in the display region includes only the contact hole (pixel) 10 for connecting the source electrode 11 and the pixel electrode 6 which are connected to the switching element 13, and it is possible to secure a large opening area for the contact hole and reduce an occurrence of the conduction failure and short-circuit failure due to a defect of the contact.

The present invention is not limited to the description of the above embodiments, and the laminated structure or the planar shape may be modified, without departing from the spirit of the present invention.

The present invention relates to a liquid crystal display apparatus, and in particular, it is applicable for use in a lateral electric field type liquid crystal display apparatus.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. A lateral electric field type liquid crystal display apparatus, comprising:
   a first substrate on which pixels are disposed in a matrix shape, each of the pixels including a plurality of signal wirings and a plurality of scanning wirings which intersect each other, a switching element provided in a region adjacent to a portion in which the signal wiring and the scanning wiring intersect or on the scanning wiring, a pixel electrode connected to the switching element, and a counter electrode to which a common potential is supplied from a common potential wiring;
   a second substrate which is provided to face the first substrate; and
   a liquid crystal which is provided between the first substrate and the second substrate,
   wherein a first electric field shield electrode, which is set to the common potential, is provided between the signal wiring and the first substrate, and the first electric field shield electrode is electrically connected with a first wiring which supplies the common potential to the first electric field shield electrode, only outside a display region in which the pixels are disposed in a matrix shape, and
   an electric field substantially parallel to the first substrate is applied between the pixel electrode and the counter electrode.

2. The liquid crystal display apparatus according to claim 1,
   wherein a second electric field shield electrode, to which the common potential is supplied from the common potential wiring, is provided so as to be superposed on the signal wiring through an insulation film between the signal wiring and the liquid crystal.

3. The liquid crystal display apparatus according to claim 1,
   wherein the switching element is an inverse staggered type TFT element, the first electric field shield electrode is disposed between the scanning wiring and the first substrate, and an insulation film is provided between the scanning wiring and the first electric field shield electrode.

4. The liquid crystal display apparatus according to claim 3,
   wherein the insulation film comprises at least a silicon oxide film.

5. The liquid crystal display apparatus according to claim 3,
   wherein the first wiring is provided in a direction in which the signal wiring extends.

6. The liquid crystal display apparatus according to claim 3,
   wherein the first wiring is provided in both of a direction in which the signal wiring extends and a direction in which the scanning wiring extends.

7. The liquid crystal display apparatus according to claim 3,
   wherein the first electric field shield electrode covers the signal wiring, when viewed from a normal direction of the first substrate.

* * * * *